United States Patent [19]

Gopinathan et al.

[11] Patent Number: 5,784,336
[45] Date of Patent: Jul. 21, 1998

[54] DELAY SCHEME AND APPARATUS FOR FOCUSSING THE TRANSMISSION AND RECEPTION OF A SUMMED ULTRASONIC BEAM

[75] Inventors: Gopal Gopinathan, Cary, N.C.; William Wong, Milton, Mass.

[73] Assignee: Furuno Diagnostics America, Inc., Cary, N.C.

[21] Appl. No.: 751,618

[22] Filed: Nov. 18, 1996

[51] Int. Cl.$^6$ .................................. G01S 3/80; G01S 3/82
[52] U.S. Cl. ........................... 367/123; 367/103; 367/119
[58] Field of Search ................................. 367/103, 119, 367/123, 138; 128/661.01; 73/609, 625, 632

[56] References Cited

U.S. PATENT DOCUMENTS

| | | |
|---|---|---|
| 4,152,678 | 5/1979 | Shott et al. |
| 4,159,462 | 6/1979 | Rocha et al. |
| 4,173,007 | 10/1979 | McKeighen et al. ............ 367/123 |
| 4,787,392 | 11/1988 | Saugeon . |
| 4,920,521 | 4/1990 | Yoshie . |
| 5,027,821 | 7/1991 | Hirama et al. . |
| 5,268,877 | 12/1993 | Odell . |
| 5,269,307 | 12/1993 | Fife et al. . |
| 5,530,681 | 6/1996 | Bloom . |

OTHER PUBLICATIONS

James Terrell Walker, "A CCD Phased–Array Ultrasonic Imaging System", Stanford University Ph.D. 1978, Chapter 3, in particular Fig. 3.2, pp. 22 and 24–27, as well as Chapter 5.

Paul N. Menig. "CCD Characterization and Application in an Ultrasonic Imaging System", MIT Thesis, May 1976, pp. 5–17, 23–29, and 32.

Primary Examiner—Ian J. Lobo

[57] ABSTRACT

A beamformer includes an array having a plurality of channels of delay elements which are constructed of charge coupled devices (CCDs). Each channel has a first plurality of delay elements cells which perform beam focussing and a second plurality of delay elements which perform beam steering. In this manner beam steering delays and beam focussing delays may be calculated independently. Typically, the second plurality of delay elements have a resolution which is typically coarser than the resolution of the first plurality of delay element cells which function to focus the beam. A signal may be inserted into any one of the delay elements of the first plurality to provide an appropriate delay. The signal is then output from the last delay element of the first plurality to the second plurality. The signal is delivered from a selected delay element of the second plurality to a charge sum data bus, which combines the signals output from each of the channels. This combined signal may then be output to a common offset delay block, which in turn outputs the array signal having a common delay. A plurality of such arrays may be coherently combined. If the required delay exceeds the maximum delay provided by each channel, the output of each array may be offset by a maximum delay of a preceding array in the plurality of arrays in order to coherently combine all of the arrays. Desirably, a shift register having a single enable bit is dynamically controlled to select the appropriate delay by selecting a CCD delay cell.

41 Claims, 8 Drawing Sheets

5,784,336

DELAY SCHEME AND APPARATUS FOR FOCUSSING THE TRANSMISSION AND RECEPTION OF A SUMMED ULTRASONIC BEAM

BACKGROUND OF THE INVENTION

1. Field of the Invention

The present application is directed to a method and apparatus for processing signals, for example, ultrasonic signals, supplied to and/or received from a distributed antenna formed of a large number of antenna elements. More particularly, the present application is directed to processing delays necessary for coherently summing received ultrasonic signals and for generating a desired transmission beam wavefront focussed at a desired point along a desired focal path by developing a delay associated with each of the constituent elements of the antenna using a two stage charge transfer delay line associated with each antenna element.

2. Background of the Invention

Ultrasonic imaging typically utilizes a transducer array composed of a plurality of imaging elements which both transmit and receive ultrasound signals. Typically, a shaped wavefront is transmitted by the transducer array and focussed along a path of interest. Reflected energy, obtained from the objects of interest along the path, is monitored to resolve an image of the objects of interest. Currently, if high resolution is to be obtained when processing signals from the array, the ultrasound reflections from the object of interest received by each transducer element of the array must be coherently summed so that all reflected energy is added to form a single reflected signal.

Resolution may be further enhanced if the wavefront generated by the array of transducer elements is closely focussed on the objects of interest. The more precise the focus of the coherent wavefront on an object of interest, the more accurate the possible imaging of the object.

In order to accurately, coherently sum the ultrasound reflections received from each of the transducer elements or to focus the emitted beam, the signals from each of the elements must be delayed a desired amount. The accuracy of this delay affects the accuracy of the summing and the minimum resolvable detail of the ultrasonic imaging system. In order to accurately delay the reflection received by each imaging element, each imaging element should be associated with a delay path containing a large number of delay elements. Accurate delay is further useful in transmission since the more accurate the delays associated with individual antenna elements, the better the focus of the beam at a desired focal point.

In order to accurately generate the coherent wavefront, the wavefront should be generated by each of a large number of antenna array elements to collectively generate a coherent wavefront of a desired shape. Where an area of interest is to be imaged, the coherent wavefront should be swept across the area of interest. Each delay element must exhibit the desired resolution and there must be a sufficient number of delay elements to provide the required delay. Thus, the higher the resolution desired, the greater the number of required delay elements for a particular delay. Also, the greater the number of delay elements, the greater the signal loss due to an increased number of transfers along the delay path.

In the digital domain, a signal is digitized and the resulting digital data representing the input signal are stored in a semiconductor random access memory (RAM) with separate input and output data ports using different read and write clocks. The delay generated is equal to the delay between the generation of the read and write clocks. The delay generated may be accurately controlled by the use of precise clocks.

In the analog domain, a signal may be applied to an analog delay line with multiple taps. The delay line may include several cascaded sections of constant inductor (L) and capacitor (C) elements. The delay is generated by selecting a signal from one of the multiple taps. The signal may be supplied to an acoustic material in which the propagation of the acoustic wave is slowed either through the bulk (BAW (bulk acoustic wave) device) or on the surface (SAW (surface acoustic wave) device) of the material. Delay is generated by selecting a signal from one of the multiple taps.

A charge coupled device (CCD) with cascaded storage cells can also be used as the delay path. In such a case, the signal may be converted to a current (or charge) equivalent and applied to the channel of the CCD along which the applied input charge is transferred at a rate dependent on the charge transfer clock. The delay is varied by changing either the transfer clock rate or the tap from which the signal is selected. When operating in the analog delay regime, the signal may be injected into a selected tap and the end of signal output from the end of the delay line.

Another method of analog delay is to inject the signal to the front end of the delay line and the output from a selected tap. The accuracy of generated delay is a function of the total delay value and the tap increment and accuracy.

An exception to the above functional relationship is in the case of the CCD cell, in which the delay accuracy is determined by the accuracy of the transfer clock as well as the number of storage cells. Use of a CCD line for delay generally is known and is disclosed in, for example, Menig, "CCD Characterization and Application in an Ultrasonic Imagining System", MIT Thesis, May 1976, pp. 5–17, 23–29, and 32.

The current delay schemes all have disadvantages associated with them. In particular, an undue number of delay elements are needed to provide sufficient delay while being able to differentiate between small differences in delay. The increased number of delay elements also reduces the signal strength, due to the increased number of transfers between delay elements, thereby also decreasing the signal to noise ratio. Therefore, the need still exists for a delay scheme and apparatus which provides more precise delays and less signal loss.

OBJECTS OF THE INVENTION

It is an object of the present invention to provide a method and apparatus for transmitting and receiving ultrasonic waves having an improved available signal dynamic range.

It is a further object of the present invention to provide a method and apparatus for transmitting and receiving ultrasonic waves which accurately compensates for time of arrival differences, thereby accurately coherently summing the incoming reflections.

It is a further object of the present invention to provide a method and apparatus for transmitting and receiving ultrasonic waves which accurately focusses the transmitted ultrasonic pulses at a desired focal point by accurately delaying the emitted pulse supplied to each antenna element.

It is another object of the present invention to provide a method and apparatus for forming fine resolution images accurately and repeatably.

It is still another object of the present invention to perform the above mentioned objects while reducing the amount of noise injected into the delayed signals.

SUMMARY OF THE INVENTION

These and other objects will become more readily apparent from the detailed description given hereinafter and are provided by the method and apparatus for transmitting and receiving a summed ultrasonic beam of the present invention. The present invention utilizes charge transfer delay devices for delaying the signals transmitted and received by each element of a distributed antenna. Each of these delay devices is provided with focus delay cells and beam steering delay cells serially connected and accessed by the selection of both a desired input tap and a desired output tap.

Such a dual selection allows the resolution of the delay elements at opposed ends of each delay device to differ, resulting in the ability to concatenate one set of delay elements having a first resolution with another set of delay elements having a second resolution. When these resolutions are different, the advantages of using relatively low resolution delay elements to provide a large delay range for beam steering and of using relatively high resolution delay elements to provide a more accurate delay for focussing are realized. Further, the corresponding disadvantages of using these delay elements of differing resolutions are eliminated. In particular, the low resolution provided by the low resolution delay elements is eliminated, and the increased number of elements and the signal loss resultant from using high resolution delay elements is avoided.

An important feature of the present application allows the delays of each of the fine and coarse delay elements of a delay device associated with an individual antenna element to be independently and dynamically selectable so that each delay may be controlled in operation. For example, it is contemplated that the present invention may be used to dynamically vary the focus of the array during the reception period after the transmission of an ultreasonic pulse.

Since the reflections received immediately after the transmission of the pulse are reflections from close objects, and since the reflections received later are from more distant objects, it is desirable to delay the reflected energy received by the end antenna elements longer immediately after a pulse is emitted and thereafter gradually reduce this delay as the desired focal point of the array moves away from the antenna to increase the array focal distance dynamically.

To facilitate this dynamic delay adjustment the fine and coarse delay elements associated with each antenna element are controlled by the selection of an input and output tap of each combined fine and coarse delay device through the use of controllable shift registers.

Preferably, according to one preferred embodiment, the high resolution delay elements are user selectable during the transmit mode and may be dynamically controlled during reception for the purpose of adaptively focussing the antenna to coherently sum the reflections at each reflected distance. The delay provided by the low resolution delay elements is preferably fixed for a scan line and is varied between scan lines to provide steering or translation of the beam across an area to be imaged.

According to another aspect of the invention, the individual antenna elements and their associated delay devices which for the entire array may be assembled into sub-arrays which are easily combined to form a large total array. When the total array requires a delay larger than that provided by the delay devices associated with each of the antenna elements, the antenna array may be divided into a plurality of sub-arrays and an offset delay may be provided with each sub-array to uniformly delay the output of the sub-array as required.

Since the offset delay is applied to the coherently summed output assembled from the outputs of the individual antenna elements of the sub-array,the total delay of delay elements associated with each of the antenna elements need only equal the maximum difference in delay within the sub-array. Any remaining delay may be provided by an offset delay associated with each of the sub-arrays. Since the coherently summed signal of each of the imaging elements of the sub-array is relatively larger in amplitude than the output of each of the individual delay devices, the relative degradation of the coherently summed sub-array output caused by noise is reduced. When the focus of the total array is curved, outputs of each channel of each sub-array may be delayed a different time, as desired, to produce a desired delay profile in the entire antenna array.

Although the primary application of the present invention is in ultrasonic imaging, the array elements may be designed to operate at any frequency of interest The antenna array may be linear, convex, or concave and may consist, if desired, of an M×N two-dimensional array of antenna elements, each having a delay produced according to the teachings of the present application.

It should be understood, however, that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limited to the present invention.

FIG. 5c illustrates a detail of the controlled focus using three levels of resolution: fine, coarse and offset, for the phase steered large array shown in FIG. 5a.

DETAILED DESCRIPTION OF PREFERRED EMBODIMENTS

The present invention is directed towards an ultrasonic distributed element array antenna and a delay device associated with each of the antenna array elements and providing necessary delay to both steer and focus the emitted beam as well as to coherently sum the reflection signals received by from each of the antenna elements. In particular, the present invention is directed to providing improved resolution by enhancing delay resolution while maintaining sufficient delay, not significantly increasing signal loss, and not significantly increasing the number of array elements.

As noted above, conventional delay schemes either select an input tap or an output tap and provide a set level of delay depending upon the resolution of the delay elements used therein. In accordance with one embodiment of the present invention, by controllably selecting both the input and the output taps a channel having at least two controllable sections of delay elements may be provided. Each of these sections may have a different number of delay elements and a different resolution per delay element.

Preferably, according to the teachings of the present application the relatively high resolution delay elements are used for beam focussing and are employed in sufficient number to produce the necessary focus delay. The resolution of the ultrasonic system of the present application is dependent on accurate focussing and thus sensing system resolution is improved by improved dynamic beam focus. A relatively lower resolution assembly of delay elements is used to steer the beam along a selected azimuth. The resolution of these elements is dependent on the angle between adjacent scan lines. Since the scan lines are preferable at regular intervals which may be selected in device design, the resolution for individual beam steering cells is selected to correspond to the desired scanning line interval. In this fashion, the lower resolution delay elements will be regularly shifted while scan line by scan line.

If desired, the delay of the steering delay elements may be varied across the face of the array so that the delay of the steering elements at the ends of the array can be made greater and the delay of the steering elements at the center of the array are relatively smaller.

Figure 1A:
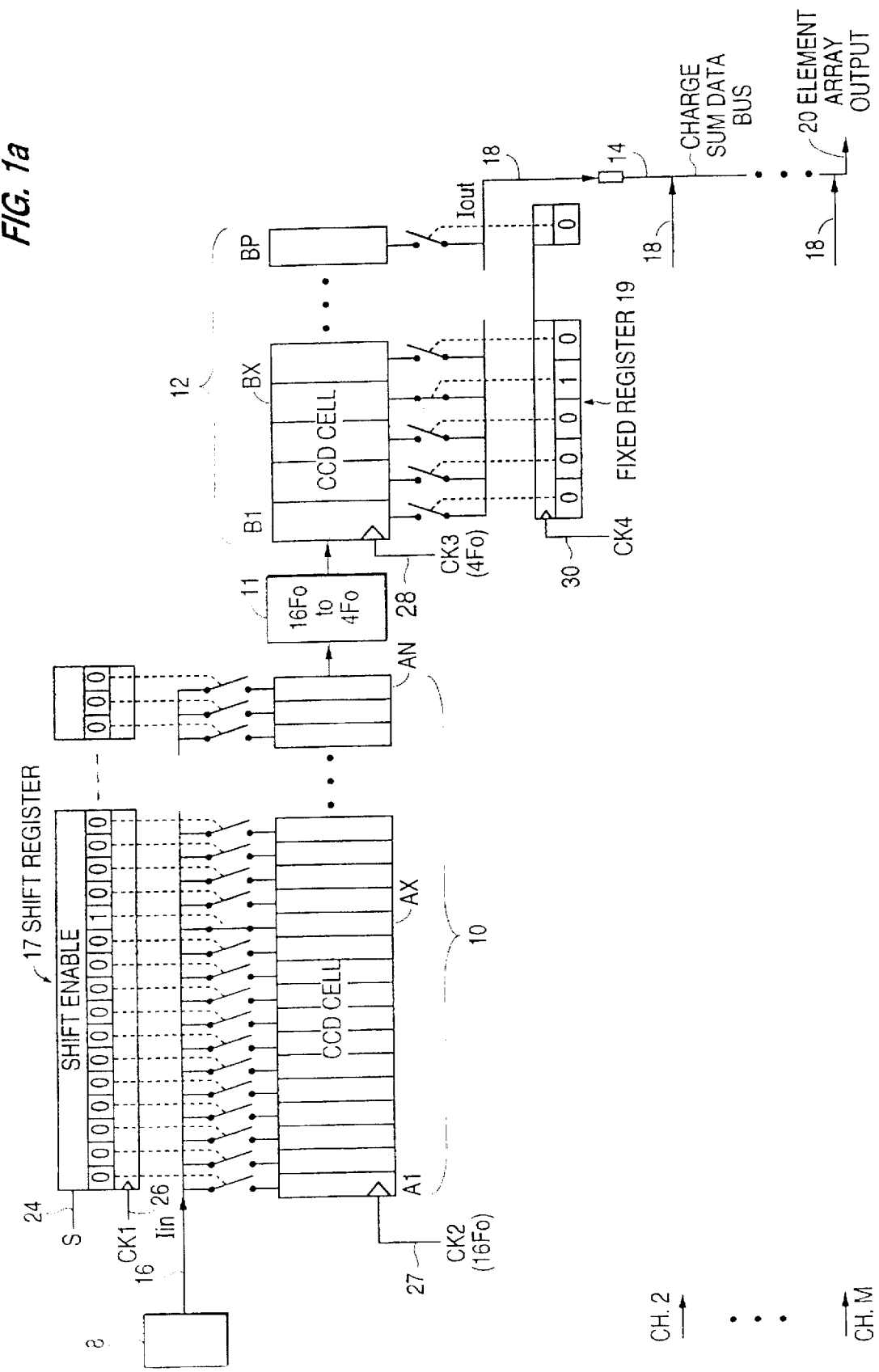
FIG. 1a schematically illustrates an embodiment of the delay architecture of the present invention for a single antenna element and its relationship to other antenna elements in an array of multiple channels.

Using a standard number of relatively low resolution delay elements in conjunction with a smaller number of high resolution delay elements, as shown generally in FIG. 1a, allows a channel to output a more accurate delay without significantly increasing the number of delay elements or the signal loss.

By beam steering with one set of delay elements and beam focussing with another set of delay elements, delay development is considerably simplified as the combined delay does not have to be separately calculated.

In another embodiment of the present invention, large arrays may be formed by combining two or more sub-arrays of antenna elements and associated delay devices as shown in FIG. 1a. When a delay larger than that provided by a single array is required in a large array, the array of antenna elements may be divided into a plurality of sub-arrays and an offset delay may be included in each sub-array to uniformly delay the output of each sub-array as needed to produce the desired delay for each of the antenna elements.

Element Array Structure

In the exemplary embodiment shown in FIG. 1a, an exemplary antenna element 8 and its associated delay device are disclosed. The entire antenna array includes a plurality of antenna elements 8, one for each channel as well as an associated delay device for each channel, where the channels are of M number and are identified as channels CH1–CHM. Each of these channels CH1–CHM receives an input signal along an input line 16 and delivers an output signal along an output line 18.

The input signal Iin is received in each channel by a first or focussing delay section 10 consisting of a plurality N of cascaded first CCD cells or delay elements A1–AN. The input signal is input to a selected one Ax of the cells A1–AN.

The detailed structure and operation of the first delay section 10 is set forth below in connection with FIGS. 3a–3c. A shift enable signal S supplied along line 24, a first shift clock signal CK1 supplied along line 26 and a first sampling clock signal CK2 supplied along line 27 control the operation of the first delay section 10. The final element AN of the first delay section delivers an output to a decimation filter 11.

The decimation filter 11 is succeeded by a second delay section 12 including a plurality P of second CCD cells or delay elements B1–BP. The decimation filter 11 delivers the signal from the final element AN of the first delay section to the first element B1 of the second delay section. A selected one Bx of the cells B1–BP delivers the output signal Iout to the output line 18.

The detailed structure and operation of the second or beam steering delay section 12 is set forth below in connection with FIG. 4. A second sampling clock signal CK3 supplied along line 28 and a second shift clock signal CK4 supplied along line 30 control the operation of the second section 12.

In the specific example shown in FIG. 1a, the sampling rate provided by the second clock signal CK3 of the second delay section 12 is slower than the sampling rate provided by the first sampling clock signal CK2 of the first delay section. As known in the art, the decimation filter 11 connects the two delay sections 10, 12 and reduces the sampling rate of the signals from the first section 10 to the second section 12.

A charge sum data bus 40 receives the output signal Iout from each channel CH1–CHM along their respective output lines 18 and adds these output signals together. The output from the charge sum data bus 14 is supplied along an element array output line 20.

Element Array Operation

When the first or focus cells A1–AN have a finer resolution than that of second or beam steering cells B1–BP, the first section 10 provides a focus delay in addition to the principal amount of delay provided by the second section 12. Although not strictly necessary, advantageously p·P>n·N, where n and p are the time resolution for the first and the second CCD delay sections 10, 12, and p>n. In a specific example, $p=1/(4F_0)$ and $n=1/(16F_0)$. Typically, $n \cdot N = 8T$ and $p \cdot P = 64T$ where $T = 1/F_0$.

The resolution of the sub-array shown in FIG. 1a is effectively the fine resolution of the first or focus cells A1–AN, rather than the coarse resolution provided by the second or beam steering cells B1–BP. With such a relationship between the first and second cells, the first cells A1–AN provide beam focus, while the second cells B1–BP provide beam steering, i.e., angular deviation from normal 22.

Figure 1B:
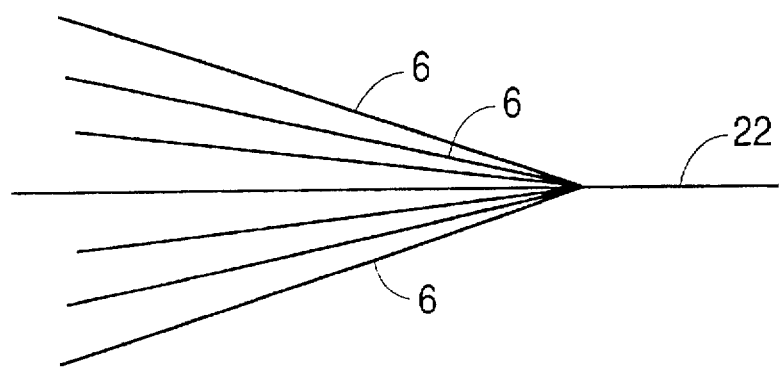
FIG. 1b is a schematic illustration of how beam steering is performed in the antenna array for a number of image scan lines.
Figure 1C:
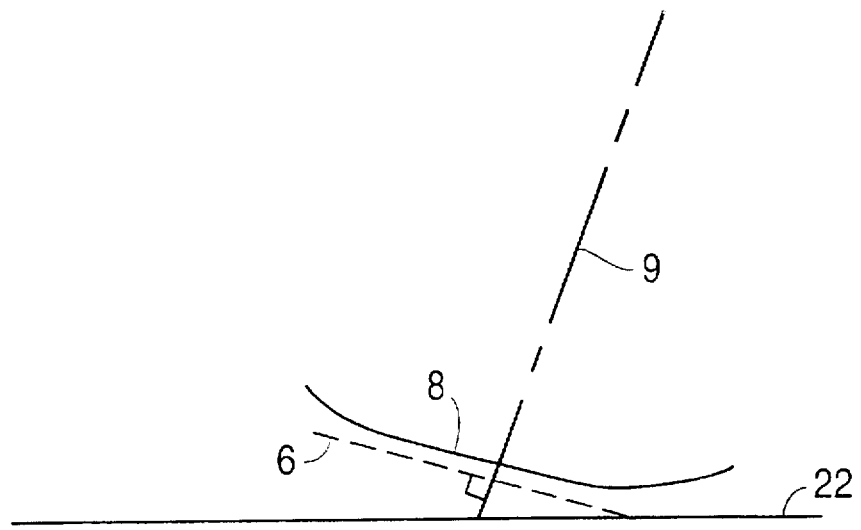
FIG. 1c is a schematic illustration of how focussing adjustment is performed along a scan line.

The different functions provided by the different sections 10, 12 are illustrated in FIGS. 1b and 1c. FIG. 1b illustrates beam steering provided by the coarse second delay section 12 for a number of scan lines 6. The first delay section 10 adjusts the focus of the beam around a normal 9 to the steered beam 6, with the resulting beam indicated as 8 in FIG. 1c.

All channels CH1–CHM operate in the same manner and have the same delay architecture. However, the signal injected into the first delay section 10 is individually controlled for each channel CH1–CHM such that the injection point of CH1 may be different from that of CH2 or any other channel. Typically, the signal extracted from the second delay section will be the same for all of the channels CH1–CHM for a given scan line. In other words, while the delay in section 10 can be dynamically increased or decreased during signal receipt or transmission by shifting the control register left or right a selected number of cells during the receive or transmit time of a scan line, the beam steering delay in section 12 is not dynamically modified within a single scan line.

First Or Focussing Delay Section Operation

Figure 3A:
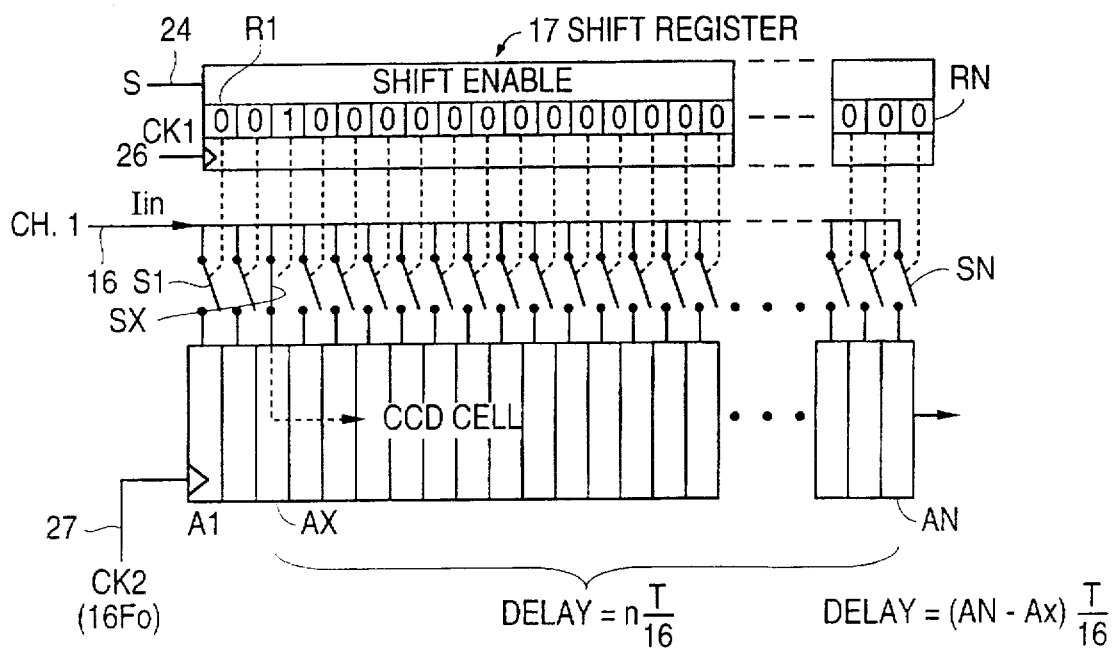
FIG. 3a illustrates the delay achieved with one particular example of the shift register content used in controlling the delay section 10 of FIG. 1.
Figure 3B:
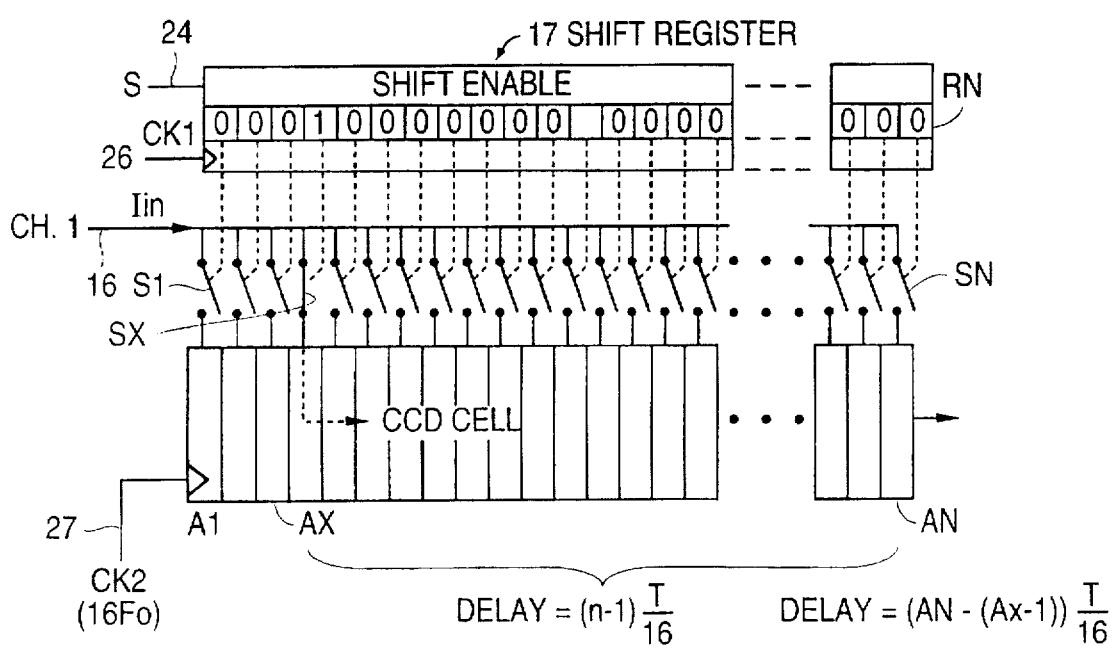
FIG. 3b illustrates the delay achieved after the contents of the shift register illustrated in FIG. 3a is shifted to right by one position.

A detailed embodiment of the first delay section 10 which preferably implements the fine dynamic focussing delay is shown in FIG. 3a. FIG. 3a includes a first shift register 17, which includes a plurality N of first shift register elements R1–RN, and a corresponding plurality N of first switches S1–SN located between each shift register element R1–RN and its associated CCD delay cell A1–AN. The output of the first shift register 17 is controlled by the first shift signal S supplied along the line 24 and the first sampling clock signal CK1 supplied along the line 26. The first shift register 17 may be any desired form of register suitable for providing a logic "1" to the desired switch Sx to activate the switch Sx.

The input signal Iin for a respective one of the channels CH1–CHM is input along the input line 16 to the first switches S1–SN. The first switches S1–SN may be of any suitable construction and may be semiconductor switches or the like controllable by the shift register elements R1–RN as would be known to one of ordinary skill in the art.

When activated in accordance with S and CK1, the first switches S1–SN send the input signal Iin to a corresponding one Ax of a plurality of first CCD cells A1–AN. Thus, the injection point or input tap, and hence the delay, is established for the first delay section 10.

The injection cell Ax of the first or fine delay section 10 is selected by the content of the first shift register 17. For example, the pattern [0001000 ... 0] represents the selection of the fourth cell, i.e., Ax=A4. When a different delay is required, the logic "1" is shifted by an appropriate number of positions.

The pattern may be shifted left or right by the signal from the first shift clock signal CK1 and shift enable signal S. Typically, this different delay is a decreasing value for the dynamic focus of deeper distance by shifting the logic "1" to the right by an appropriate number of positions, as can be seen, for example in FIG. 3a and 3b. Such shifting is shown, for example, in FIG. 3b, in which the first shift clock signal CK1 shifts the original signal in the first shift register elements R1–RN, one cell to the right when the first shift clock signal CK1 is synchronized to the acoustic propagation velocity of the media of interest, a continuous focus is attained.

Figure 3C:
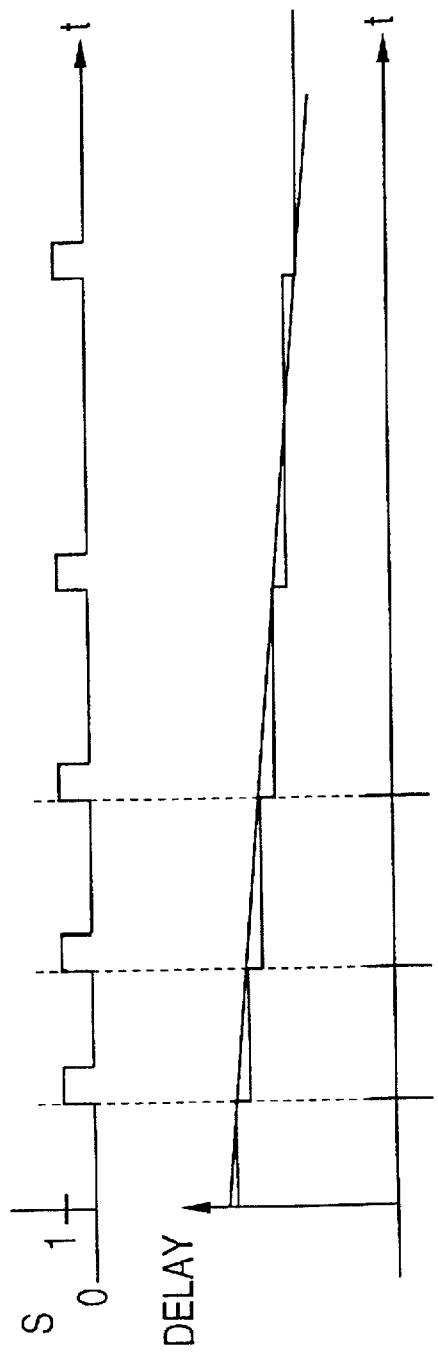
FIG. 3c is a time chart illustrating a typical time sequence of the shift register control signal S and the corresponding delay in the signal path as used with FIG. 3a, 3b.

In FIG. 3c, the shift enable signal S is illustrated in the upper plot. The corresponding delay is shown in the lower plot. The first three S signals correspond to the configuration shown in FIG. 3a, while the last three S signals correspond to the configuration shown in FIG. 3b.

Once the input signal Iin is input into the cell Ax, this signal travels to the last cell AN in accordance with the clock signal CK2 supplied along line 27.

When the cascaded first cells A1–AN of the fine or focus delay section 10 of each channel CH1–CHM each provide a resolution of $\lambda/r_1$, where $\lambda$ is the input signal wavelength and $r_1$ is the resolution factor of a first cell, each channel CH1–CHM has a maximum adjustable delay Dmax given by:

$$Dmax = N \times \lambda / r_1 \qquad (1)$$

The input signal (charge or current proportional to signal voltage amplitude) may be injected into any one of the N first cells A1–AN. The output is taken at the final first cell AN and supplied to the second delay section 12 via the decimation filter 11.

In accordance with the first sampling clock signal CK2, the input signal Iin is supplied from a selected cell Ax of the first cells A1–AN to the final cell AN. The output appears at the Nth (final) cell AN after AN–Ax sampling clock cycles later, where Ax is the selected first cell location. When the cell Ax is the injection point, the focus delay $D_f$ before the signal appears at AN is:

$$D_f = (AN - Ax) \times \lambda / r_1 \qquad (2)$$

Thus, a desired focus delay can be achieved by appropriate selection of AX at $\lambda/r_1$ intervals.

Operation of Second Or Beam Steering Delay Section

Figure 4:
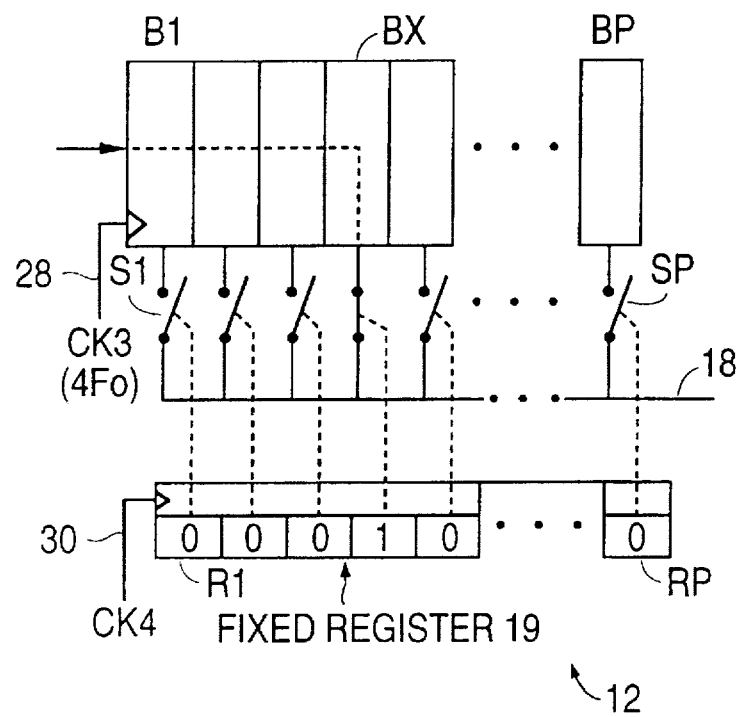
FIG. 4 illustrates the delay achieved with one particular value in the fixed register controlling the delay section 12.

A detailed embodiment of the second or beam steering delay section 12 is shown in FIG. 4. The components of the second delay section 12 are similar to the first delay section 10. Rather than delivering an input signal Iin to a selected cell, an output signal is selected from one of the second cells B1–BP. The second delay section 12 does not use a shift enable signal as does the first delay section 10.

FIG. 4 includes a second shift register 19, including a plurality P of second shift register elements R1–RP, and a corresponding plurality P of second switches S1–SP. Unlike the first shift register elements R1–RN, the second shift register elements R1–RP are not dynamically modified within a single scan line. In other words, the selected cell Bx from the second or coarse delay section 12 is preferably fixed for each scan line and is changed only between scan lines. An output of a selected cell Bx of the second cells B1–BP is selected by the second switches S1–SP. The signal from the decimation filter 11 travels from B1 to the selected cell Bx in accordance with the second sampling clock signal CK3 supplied along a line 28. The selected output from the selected cell Bx is then supplied to the output line 18.

When activated in accordance with the second shift clock signal CK4 supplied by line 30, the second switches S1–SP send the output from the selected cell Bx to the output line 18. Thus, the extraction point or output tap is established.

The extraction cell Bx of the second delay section 12 is selected by the content of the second shift register 19. For example, the pattern [0001000...0] represents the selection of the fourth cell, i.e., Bx=B4, as shown in FIG. 4.

The steering delay $D_S$ before the signal appears at the extraction point is:

$$D_S = (BX-B1)(\lambda/r_2) \qquad (3)$$

where $r_2$ is the resolution factor of a second cell. Thus, a desired beam steering delay can be realized by appropriate selection of Bx at $\lambda/r_2$ intervals.

Exemplary Construction of an Element Array

In the configuration shown in FIG. 1a, the element array may contain 32 channels (M=32). The first section 10 of each channel may contain 128 cascaded CCD cells (N=128). Each cell in the first section 10 may provide $\lambda/16$ resolution. Thus, from equation (1), each channel has a maximum adjustable delay of $8\lambda$. When, for example, cell A4 is the injection point, the delay before the signal appears at the last cell A128 is given by equation (2) and equals $7.75\lambda$. When a different delay is required, the logic "1" is shifted by an appropriate number of positions, calculated in $\lambda/16$ increments.

The second section 12 of each channel may contain 256 CCD cells (P=256), each providing a resolution of $\lambda/4$. Thus, the second section 12 provides a steering delay of up to a $64\lambda$ having a resolution of $\lambda/4$ to the focus delay of $8\lambda$ of the first section 10.

The total number of CCD cells is less than 13,000 for an element array having M=32 channels, which may be easily integrated into a single monolithic device.

Combining Element Arrays

As can be seen in FIGS. 2a–2d, when imaging or detecting requires more than M channels, a plurality J of M channel element arrays may serve as sub-arrays SA1–SAJ. These sub-arrays SA1–SAJ are combined to form a large array beamformer.

Figure 2A:
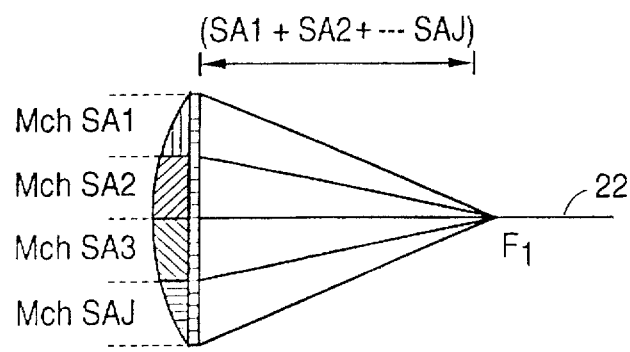
FIGS. 2a–2c schematically illustrate varying degrees of focus obtained from varying degrees of delay in a large total array including a plurality of arrays of FIG. 1 serving as sub-arrays of the total array.
Figure 2B:
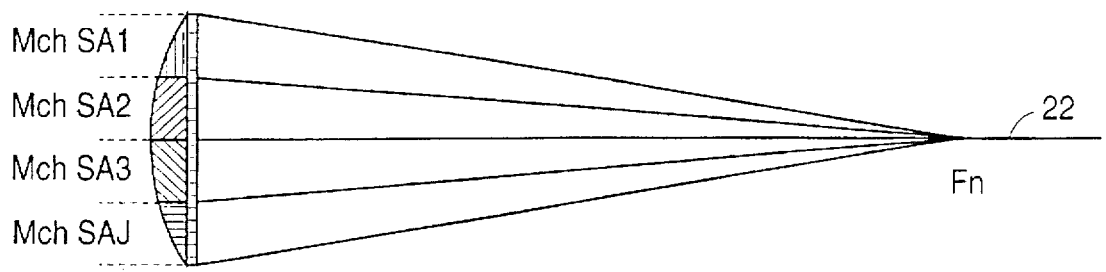

In FIGS. 2a and 2b, an array having its focus normal to a central array axis 22 requires a maximum delay for the center sub-arrays and a minimum delay for the end sub-arrays. When the focal distance f equals the aperture length L (where L=SA1+SA2+SA3+...+SAJ, or, when M is the same for each sub-array, L=JM), corresponding to an f number equal to 1, the maximum delay Dmax is given by:

$$Dmax = 0.118 \times L \qquad (4)$$

Figure 2C:
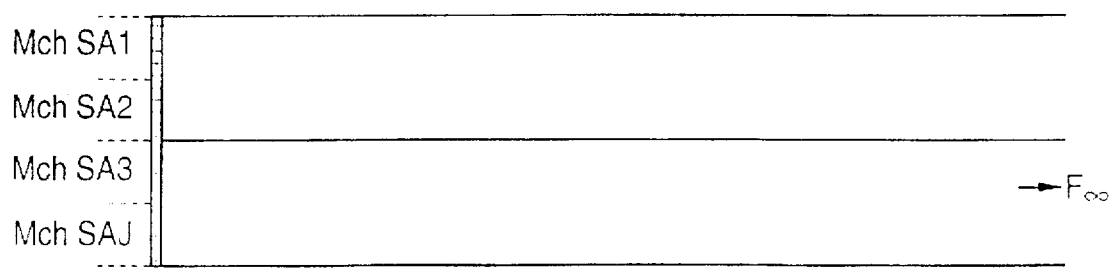

From equation (1) Dmax also equals $N\lambda/r$. Thus, the section 10 delay may be used up to a maximum aperture length Lmax, given by:

$$Lmax = (N/0.118)(\lambda/r) \qquad (5)$$

and focus to an f number equal to 1 to infinity, as shown in FIG. 2c.

Thus, the maximum number Jmax of sub-arrays, where Jmax is an integer, that may be combined by simply physically connecting the outputs of the respective charge sum data buses is given by:

$$Jmax = [Lmax/(M \cdot d)] \qquad (6)$$

where [] indicates truncation to an integer and d is the spacing between the element.

FIG. 2a–2c shows an arrangement for interfacing J of the sub-arrays shown in FIG. 1a, making up a M X J channel complete array. If spacing between channels is d=0.5$\lambda$, then, for this condition and from equation (4), the maximum delay for the center sub-array is $0.12 \times JMd$. If this maximum delay is less than the total delay $N(\lambda/r_1)$ provided by each channel, this delay may be provided by the J sub-arrays with no offset required.

In the example shown in FIGS. 2a–2c, four sub-arrays (J=4), such as shown in FIG. 1, are interfaced, making up a complete array of 128 channels. From equation (4), if inter-element spacing is 0.5$\lambda$, the maximum delay is $0.12 \times 128 \times 0.5\lambda = 7.68\lambda$. From equation (5), the section 10 delay of $8\lambda$ may be used for an aperture up to $67\lambda$. In practice, assuming thirty-two channels, i.e., M=32, in each sub-array, from equation (6), four such sub-arrays may be connected without requiring any offset delay.

Figure 2D:
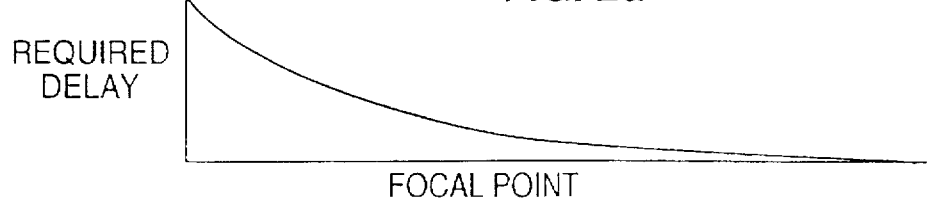
FIG. 2d is a graphical representation of the distance from the array to a desired focal point versus the required delay.

The relationship between the required delay and the focal point is shown in FIG. 2d. This relationship may be used to choose the selected cell Ax of the first delay section 10.

Element Array Offset

Figure 5A:
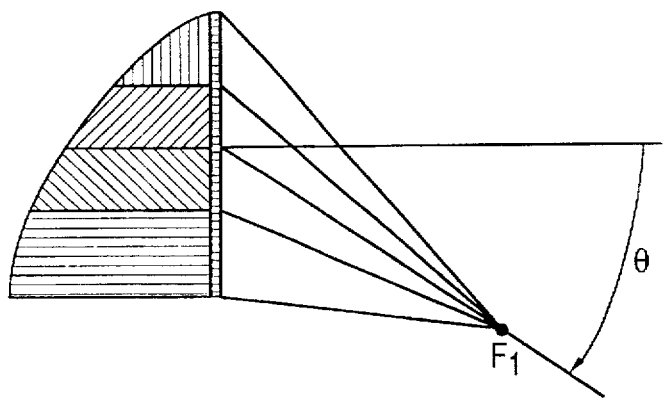
FIG. 5a illustrates a large phase steered array having a certain focal point.
Figure 5B:
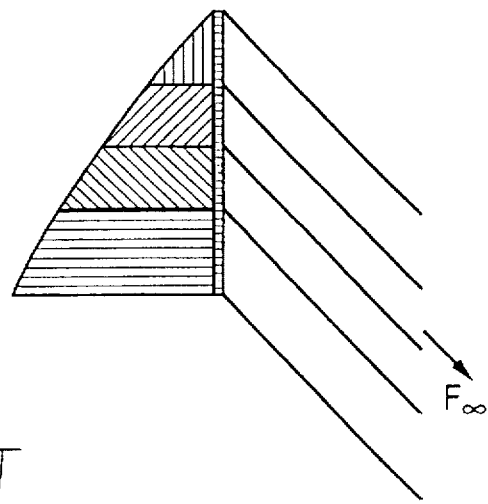
FIG. 5b illustrates a large phase steered array having an infinite focus.
Figure 5C:
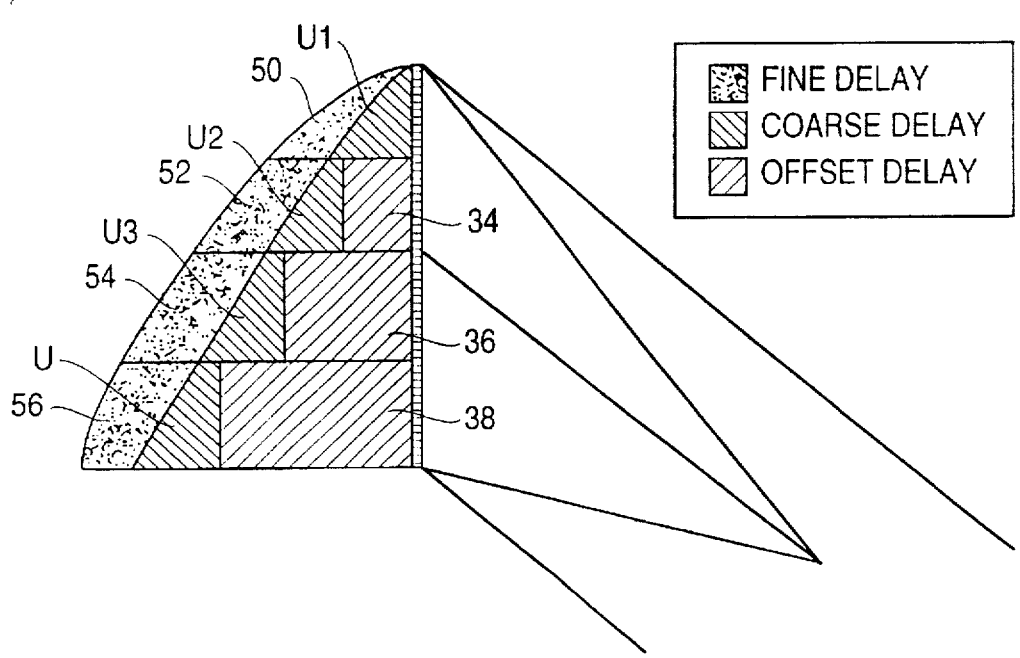

When delays are to be larger than $N\lambda/r$, as required, for example, when an array is phase steered by angle $\theta$ as shown in FIGS. 5a–5c, or when using concave or convex arrays, the section 10 and 12 delays may not be sufficient without an inordinant number of delay elements. In particular, for the sub-arrays SA1–SAJ, delay profiles T1–T(J+1) are on respective ends thereof, such that the first sub-array SA1 has delay profiles T1 and T2, the second sub-array SA2 has delay profiles T2 and T3, etc., with the final sub-array SAJ having delay profiles TJ and T(J+1).

When a delay which is larger than that which can be provided by a channel, for the particular example discussed above, $8\lambda$, the delay provided by the first delay section 10 is not sufficient. This may be compensated for by providing an offset delay which is equal to the maximum delay of the preceding sub-array in addition to the variable delay profile across the sub-array of interest.

Figure 6:
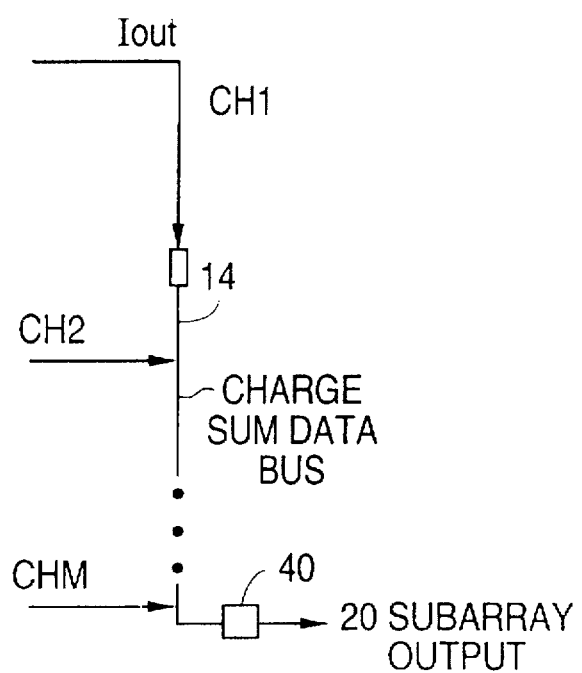
FIG. 6 shows an array as in FIG. 1 including an offset block.

In order to provide the desired offset to the entire sub-array, as can be seen in FIG. 6, a common offset delay block 40 is inserted at the output of the array shown in FIG. 1a. This offset delay block provides the same amount of additional delay for all channels and scan lines. While in one preferred embodiment the focus delay elements 10 and beam steering elements 12 are collectively used with an offset delay, the offset delay may be used with single resolution delay elements.

Figure 7:
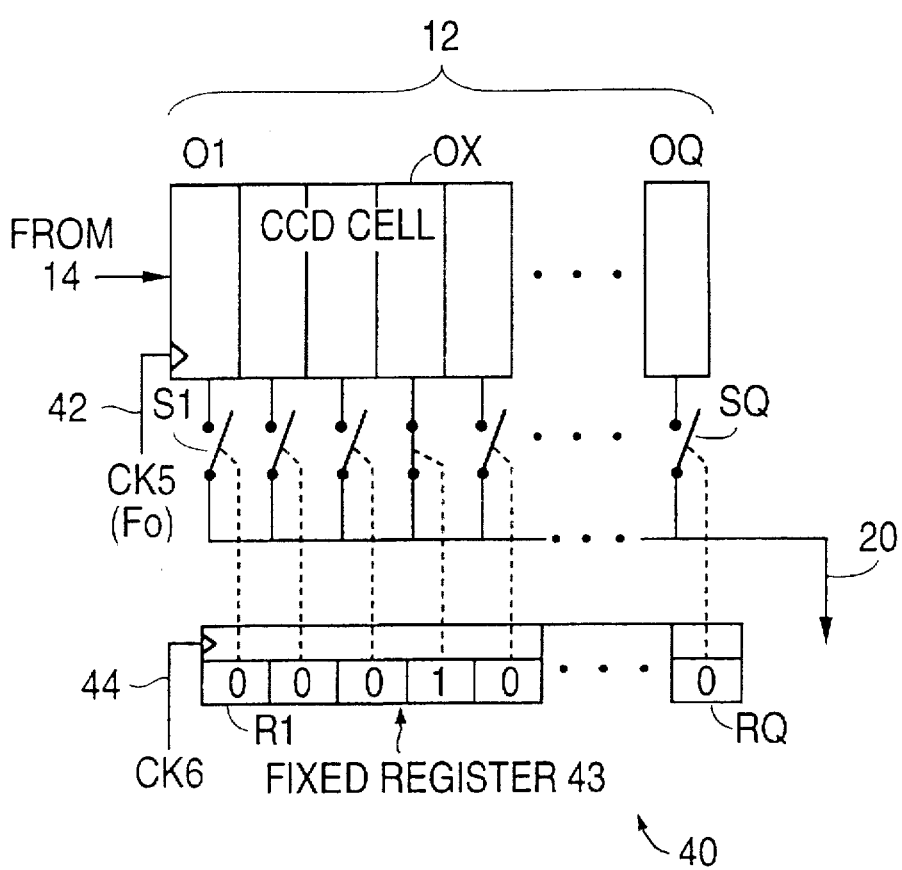
FIG. 7 illustrates a configuration of the delay generation and control of delay in the offset block 40 shown in FIG. 6.

As can be seen in FIG. 7, the common offset delay block 40 has a similar architecture to that of the second section 12 shown in FIG. 4. The common offset delay block 40 includes a third shift register 43, which has a plurality Q of third register elements R1–RQ, and a plurality Q of third switches S1–SQ. However, the charge capacity of each of the third cells O1–OQ in the common offset delay block 40 is greater than that of each of the first cells A1–AN in the first section 10 or the second cells B1–BP, the signal dynamic range of the third cells O1–OQ is greater than that of the first cells A1–AN, and there are more third cells in the offset delay block than in the first section 10, i.e., Q>N.

The offset delay block 40 inserts the combined signal all M channels from the summing data bus 14 into a first third cell O1. The inserted signal travels along the offset delay block 40 in accordance with a third sampling signal CK5 supplied along a line 42 until a selected cell Ox is reached. The selection is performed in accordance with a third sampling clock signal CK6 supplied along line 44.

Similarly to the second delay section 12, the extraction cell Ox of the offset delay block is selected by the contact of the third shift register 43. The offset delay Do is:

$$Do=(Ox-O1)(\lambda/r_3) \tag{7}$$

where $r_3$ is the resolution factor of the offset delay block 40. Thus, a desired offset delay can be realized by an appropriate selection of Ox at $\lambda/r_3$ intervals.

By varying the offset delay for each array and the variable first section 10 for all channels within each array, all other steering angles and focal distances may be accommodated. Thus, a large array may be controlled for beamforming and steering using element array architecture including an offset serving as the sub-arrays of the large array.

The charge capacity of the third cell in the common offset delay block 40 is preferably at least equals that of the first cells in the first section 10 by a number of channels M, in the specific example above, 32, in the element array. The signal dynamic range of the third cells in the common offset delay block 10 is at least equal to the square root of the number of channels in each sub-array, times more than that of the first cells in the first section 10. Preferably, there are forty-eight third cells, i.e., Q=48, in the offset delay block 40, providing 48$\lambda$ of delay with $\lambda$ resolution. Note however, that the higher resolution provided by the first section 10 is still maintained.

FIG. 5b illustrates the differences in delay required from each sub-array when the focal length is at infinity and the large array is phase steered by angle $\theta$. When the focal length is at infinity, only coarse and offset delay are required. When the focus is not at infinity, as shown in FIG. 5a, fine delay is also required to achieve the desired beam form. A detailed description of all these delay levels is shown in FIG. 5c and the key set forth therein.

When the beam is steered along by the angle $\theta$ away from the center or normal 2__ of the aperture made up of the arrays SA1+SA2+SA3+ . . . +SAJ, the delay curve for SA1 is as illustrated by a region U1 and dotted area 50 in FIG. 5c. The dotted area 50 is realized using the first delay section 10 to implement dynamic focusing. The region U1 represents delay necessary for steering the beam. For the sub-array SA2, the delay curve is a combination of a dotted area 52, a shaded area 34 and a region U2. The delay represented by the shaded area 34 indicates that delay common to all array elements within the sub-array SA2. This common delay has a fixed value equal to a region bounded by the maximum width of the cross hatched region U1, which is the maximum delay steering delay of the previous sub-array SA1. Thus, this fixed offset delay may be inserted into the sub-array SA2 with a variable delay forming the region U2 for array elements and then summed to the output of the sub-array SA1.

Similarly, for the sub-array SA3, an offset delay indicated by a shaded area 36 equals the maximum delay of the sub-array SA2, and a variable profile U3 will allow coherent summation to the previous sub-array combination, T1 to T3. All of the following sub-arrays may be treated in an analogous manner. For the final sub-array SAJ, an offset delay indicated by a shaded area 38 equals the maximum delay of the sub-array SA(J-1), and a variable profile UJ will allow coherent summation to the previous sub-array combination, T1 to TJ. Thus, the full array defined by the delay T1 to T(J+1) is coherently combined.

Conclusion

The present invention provides many advantages. These include allowing the processing of the signal in the analog domain while controlling the delay value precisely with fixed clocks, and eliminating the need for high speed analog-to-digital converters which have smaller dynamic range than the sampled data approach and consume high power. Further, use of a fixed clock eliminates any frequency modulation of the sample data within the CCD shift register. Synchronous clocking and a single frequency may be effectively employed to reduce clock noise and improve available dynamic range. The total number of delay elements required for large arrays may be reduced by using sub-aperture and offset delays.

The use of a shift clock at $16F_0$, where $F_0$ is the signal frequency, assures minimal time quantization errors in the beamformer, making this approach easier to implement than any form of time and/or amplitude interpolation scheme. The use of signal in either charge packet throughout the CCD delay shift register allows better signal sampling and efficient coherent summation of delayed signals. The use of the split CCD cells provides for signal attenuation and apodization.

The invention being thus described, it would be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A beamformer for forming a beam at a wavelength $\lambda$ comprising:

an array of antenna elements; and a charge transfer delay device associated with each of said antenna elements and providing a desired delay to its respective antenna element, each said antenna element being each associated with a desired delay so that said array of antenna elements collectively produces a desired beam profile, the desired delay being composed of a desired focus delay for focussing said array of antenna elements at a desired focal length and a desired beam steering delay for steering the beam along a desired azimuth, each said charge transfer delay device including, a first delay device portion formed of a plurality N of first delay cells of a first delay resolution factor $r_1$, a second delay device portion formed of a plurality P of second delay cells of a second delay resolution factor $r_2$ substantially different from said first delay resolution factor $r_1$, said second delay device portion being connected to said first delay device portion at a delay resolution interface, an input port for inputting a signal into a selected one of said plurality N of first delay cells, n cells from said delay resolution interface, to produce a total first delay in said first delay device portion of n*($\lambda/r_1$), and an output port for outputting the signal from a selected one of said plurality P of second delay cells, p cells from the delay resolution interface, to produce a total second delay in said second delay portion of p*($\lambda/r_2$);

one of said first and second delay device portions providing said desired focus delay and the other of said first and second delay device portions providing said desired beam steering delay to collectively form the desired delay for each antenna element associated with each charge transfer delay device.

2. The beamformer of claim 1, further comprising:

means, associated with each of said antenna elements, for selecting a desired focus delay to produce the desired beam focus and a desired beam steering delay for steering the beam along a desired azimuth, and for determining the number of respective first and second delay cells necessary to obtain these desired delays;

means, responsive to said means for selecting, for injecting, for each delay device, the signal into the input port of a selected one of said first delay cells; and means, responsive to said means for selecting, for outputting, for each delay device, the delayed signal from the output port from a selected one of said second delay cells.

3. The beamformer of claim 2, further comprising:

means for summing the delayed signal output from each said antenna element and its associated delay device into a combined signal; and means for outputting the combined signal.

4. The beamformer of claim 1, further comprising means for altering a sampling rate between said first plurality of cells and said second plurality of cells.

5. The beamformer as recited in claim 2, wherein each said input port includes, respective shift registers receiving shift clock signals to select into which of said first plurality of cells said signal is to be injected, respective logic circuits, each receiving an output from a corresponding one of said shift registers and a sampling clock signal to determine if a cell selected by said corresponding one of said shift registers is an actual cell into which said signal is to be injected and outputting concurrence only for the actual cell, and respective switches, each receiving an output from a corresponding one of said logic circuits and the signal to be injected, said switches injecting the signal into a corresponding cell when an output from said corresponding one of said logic circuits indicates concurrence that the corresponding cell is the actual cell.

6. The beamformer of claim 1 wherein the delay produced in each of the first delay cells is substantially longer than the delay produced by said second delay cells.

7. The beamformer of claim 6 wherein said first delay device portions produce the desired beam steering delay and said second delay device portions produce the desired focus delay.

8. The beamformer of claim 1 wherein the delay produced by each of said second delay cells is substantially longer than the delay produced by said first delay cells.

9. The beamformer of claim 8 wherein said second delay device portions produce the desired beam steering delay and said first delay device portions produce the desired focus delay.

10. The beamformer of claim 1 wherein each of said first and second delay device portions includes, a plurality of delay cells, each delay cell including a cell access port for the introduction of a signal thereto or the removal of a signal therefrom, and a delay device input or output, each of said delay device portions having a signal to be delayed either introduced to the cell access port and removed from the delay device output or introduced into the delay device input and removed from said cell access port along the delay path, each said delay device portion further including a cell access port selector for selecting a cell access port in response to a delay selection command signal;

said cell access ports of said first and second delay device portions being each connected to one of said input and output ports.

11. The beamformer of claim 10 wherein said cell access port selector includes, a shift register having a number of register elements equal to the number of delay cells in its associated delay device portion, said shift register having an enable bit, shifted in response to the delay selection command signal, to the delay cell associated with the desired delay, and a switch associated with each of said delay cells, and connecting its associated delay cell access port to the delay path to form the desired delay, said switch being actuated in response to the presence of the enable bit to connect the charge transfer device into the delay path at the selected delay cell access port.

12. The beamformer of claim 1 wherein the delay cells of one of said first and second delay device portions at an end of the array have a longer delay than the corresponding cells closer to the center of the array.

13. A beamformer for forming an ultrasonic beam comprising:

plural antenna sub-arrays, each antenna sub-array including, plural antenna elements, each said antenna element requiring a desired delay to produce a desired beam profile, said desired delay including a common delay portion common to all antenna elements of said sub-array and an individual delay portion associated with each individual antenna element, said common delay portion and said individual delay portion collectively forming the desired delay for each of said antenna elements, an individual delay device associated with each of said antenna elements and providing an individual delay portion associated with its respective antenna element, said individual delay portion, when added to the signal associated with each antenna element, forming a time delayed signal and causing the outputs of said individual delay devices associated with each of said antenna elements of a single antenna sub-array to match the desired beam profile when added to a common delay portion, a signal adder for summing the time delayed signals of each antenna element of said sub-array, and a sub-array common offset delay device associated with said sub-array and adding a common delay to the output of said signal adder to develop a desired delay for each of said antenna elements of said sub-array; and means for summing the outputs of said sub-array common offset delay devices of each of said plural sub-arrays;

the common delay of said sub-array common offset delay device of each said sub-array allowing the desired delay associated with each antenna element to exceed a maximum delay of each individual delay device.

14. The beamformer of claim 13, wherein said sub-array common offset delay device introduces less noise to the output of said signal adder than corresponding individual delay portions would introduce to signals output from each individual delay device if provided with the same delay capacity as the capacity of said sub-array common offset delay device.

15. The beamformer of claim 13, wherein the beam is formed at a wavelength $\lambda$, and wherein each said delay

15 device provides a desired individual delay portion to its associated antenna element, the signal associated with each antenna element being delayed by a desired delay so that said array of antenna elements collectively produces a desired beam profile, the desired delay being composed of a desired focus delay for focussing said array of antenna elements at a desired focal length and a desired beam steering delay for steering the beam along a desired azimuth, each said delay device including, a first delay device portion formed of a plurality N of first delay cells of a first delay resolution factor $r_1$, at least some of said first delay cells having cell access ports, a second delay device portion formed of a plurality P of second delay cells of a second delay resolution factor $r_2$ substantially different from said first delay resolution factor $r_1$, at least some of said second delay cells having cell access ports, said second delay device portion being connected to said first delay device portion at a delay resolution interface, an input port for inputting a signal into a selected one of said plurality N of first delay cells, n cells from said delay resolution interface to produce a total first delay in said first delay device portion of $n*(\lambda/r_1)$, and an output port for outputting the signal from a selected one of said plurality P of second delay cells, p cells from the delay resolution interface to produce a total second delay in said second delay portion of $p*(\lambda/r_2)$;

one of said first and second delay device portions providing said desired focus delay and the other of said first and second delay device portions providing said desired beam steering delay to collectively form the desired delay for each antenna element associated with each charge transfer delay device.

16. The beamformer of claim 15 wherein said individual delay devices and said common offset delay device are formed of charge transfer devices.

17. The beamformer of claim 15 further comprising:

means for selecting a desired delay associated with each of said antenna elements to produce the desired beam profile and for determining the number of respective first and second delay cells necessary to make up the desired delay;

means, responsive to said means for selecting, for injecting, for each delay device, the signal into the cell access port of a selected one of said first delay cells; and means, responsive to said means for selecting, for outputting, for each delay device, the delayed signal from the cell access port of a selected one of said second delay cells.

18. The beamformer as recited in claim 15, wherein each said common offset delay includes a plurality of common offset delay cells, the number of said common offset delay cells being greater than the number of said plurality N of first delay cells.

19. The beamformer as recited in claim 18, wherein each of said common offset delay cells, said first delay cells and said second delay cells have a charge capacity, the charge capacity of each common offset delay cell equaling a product of the number of antenna elements and the charge capacity of each cell in said plurality N of first delay cells.

20. The beamformer as recited in claim 18 wherein said common offset delay device has twice as many cells as said plurality N of first delay cells, each of said common offset delay cells having a resolution factor equal to said first resolution delay factor $r_1$.

16

21. The beamformer as recited in claim 18, wherein the common delay produced by said sub-array common offset delay device of each sub-array is equal to a maximum desired delay of all antenna elements of a preceding sub-array in said plural antenna sub-arrays.

22. The beamformer of claim 15, further comprising means for altering a sampling rate between said first plurality of cells and said second plurality of cells.

23. The beamformer of claim 13 wherein each said individual delay portion includes, a plurality of delay cells, each delay cell including a cell access port for the introduction of a signal thereto or the removal of a signal therefrom, and a delay device input or output, each of said individual delay portions having a signal to be delayed either introduced to the cell access port and removed from the delay device output or introduced into the delay device input and removed from said cell access port along the delay path;

each said delay device portion further including a cell access port selector for selecting a cell access port in response to a delay selection command signal.

24. The beamformer of claim 23 wherein said cell access port selector includes, a shift register having a number of register elements equal to the number of delay cells in its associated delay device portion, said shift register having an enable bit, shifted in response to the delay selection command signal, to the delay cell associated with the desired delay, and a switch associated with each of said delay cells, and connecting its associated delay cell access port to the delay path to form the desired delay, said switch being actuated in response to the presence of the enable bit to connect the charge transfer device into the delay path at the selected delay cell access port.

25. The beamformer of claim 13 wherein each said common offset delay device includes, a plurality of offset delay cells, each delay cell including a cell access port for the introduction of a signal thereto or the removal of a signal therefrom, and a delay device input or output, each of said offset delay cells having a signal to be delayed either introduced to the cell access port and removed from the delay device output or introduced into the delay device input and removed from said cell access port along the delay path, each said offset delay cell further including a cell access port selector for selecting a cell access port in response to a delay selection command signal.

26. The beamformer of claim 25 wherein said cell access port selector includes, a shift register having a number of register elements equal to the number of delay cells in its associated delay device portion, said shift register having an enable bit, shifted in response to the delay selection command signal, to the delay cell associated with the desired delay, and a switch associated with each of said delay cells, and connecting its associated delay cell access port to the delay path to form the desired delay, said switch being actuated in response to the presence of the enable bit to connect the charge transfer device into the delay path at the selected delay cell access port.

27. A beamformer for forming a beam at a wavelength $\lambda$ comprising:

an array of antenna elements, each said antenna element being each associated with a desired delay in a signal path between said array element and processing circuitry so that said array of antenna elements collectively produces a desired beam profile.; and a charge transfer delay device associated with each of said antenna elements and providing the desired delay associated with its respective antenna element in the signal path, each said charge transfer delay device including, a plurality of delay cells, each delay cell including a cell access port for the introduction of a signal thereto or the removal of a signal therefrom, and a delay device input or output, said charge transfer delay device having a signal to be delayed either introduced to the cell access port and removed from the delay device output or introduced into the delay device input and removed from said cell access port along the delay path, each said charge transfer delay device further including a cell access port selector for selecting a cell access port in response to a delay selection command signal.

28. The beamformer of claim 27 wherein said cell access port selector includes, a shift register having a number of register elements equal to the number of delay cells in its associated charge transfer delay device, said shift register having an enable bit, shifted in response to the delay selection command signal, to the delay cell associated with the desired delay, and a switch associated with each of said delay cells, and connecting its associated delay cell access port to the delay path to form the desired delay, said switch being actuated in response to the presence of the enable bit to connect the charge transfer device into the delay path at the selected delay cell access port.

29. A method for forming a beam at a wavelength $\lambda$ comprising the steps of:

providing an antenna array having a plurality of antenna elements;

defining a desired beam profile to be emitted from or received by said antenna array, said desired beam profile being developed by associating a desired delay with each of said plural antenna elements, the desired delay including a desired focussing delay and a desired beam steering delay for steering the beam along a desired azimuth; and using a charge transfer delay device associated with each of said antenna elements to develop the desired delay assigned to each said antenna element to develop a desired beam profile by, forming a first delay portion from a plurality N of first delay cells of a first delay resolution factor $r_1$, and forming a second delay portion from a plurality P of second delay cells of a second delay resolution factor $r_2$ substantially different from said first delay resolution factor $r_1$, said second delay portion being connected to said first delay portion at a delay resolution interface;

inputting a signal into a selected one of said plurality N of first delay cells, n cells from said delay resolution interface to produce a total first delay in said first delay portion of $n*(\lambda/r_1)$; and outputting the signal from a selected one of said plurality P of second delay cells, p cells from the delay resolution interface to produce a total second delay in said second delay portion of $p*(\lambda/R_2)$;

one of said steps of forming first and second delay portions providing the desired focussing delay and the other of said steps of forming first and second delay portions providing the desired beam steering delay to collectively form the desired delay for each antenna element associated with each charge transfer device from said total first and second delays.

30. The method of claim 29 further comprising:

selecting a desired delay associated with each of said antenna elements to produce the desired beam profile;

determining the number of respective first and second delay cells necessary to make up the desired delay.

31. The method of claim 30 further comprising:

summing the delayed signal output from each said antenna element and its associated delay device into a combined signal; and outputting the combined signal.

32. The method of beamforming of claim 29 wherein the delay device portions producing the beam steering delay have a delay time substantially longer than the delay device portions producing the focussing delay.

33. The method of claim 30 wherein said step of selecting is accomplished by employing a first shift register having a number of register elements equal to the number of first delay cells and a single enable bit which is shifted to select a desired one of said first delay cells.

34. The method of claim 33 wherein said step of selecting is further accomplished by employing a second shift register having a number of register elements equal to the number of second delay cells and a single enable bit which is shifted to select a desired one of said second delay cells.

35. A method of forming an ultrasonic beam comprising:

a) providing plural antenna sub-arrays, each antenna sub-array including plural antenna elements, each said antenna element requiring a desired delay to produce a desired beam profile, said desired delay including a common delay portion common to all antenna elements of said sub-array and an individual delay portion, said common delay portion and said individual delay portion collectively forming the desired delay for each of said antenna elements, b) providing an individual delay device associated with each respective antenna element, c) producing a time delayed signal associated with each antenna element by adding an individual delay produced by the individual delay device produced in said step c) to the signal associated with each antenna element to thereby cause the outputs of said delay devices associated with each of said antenna elements of a single antenna sub-array to match the desired beam profile when added to a common delay portion, d) summing the time delayed signals of each antenna element of said sub-array to form a time delayed sub-array sum signal, and e) adding a common delay to the time delayed sub-array sum signal to develop a sub-array output including a desired delay for each of said antenna elements of said sub-array, f) summing the sub-array outputs;

the common delay of said sub-array added in said step e) allowing the desired delay associated with each antenna element to exceed the maximum delay of each individual delay portion.

36. The method of claim 35 wherein step e) of adding a common delay introduces less noise to the time delayed sub-array sum signal developed in said step d) than corresponding individual delays would introduce to the signals output from each individual delay device if provided with the same delay capacity of said common delay.

37. The method of claim 35 wherein said method forms a beam of a wavelength $\lambda$, and wherein the delay device provided in said step b) provides a desired individual delay portion to its associated antenna element, the step c) of producing a time delayed signal so that said array of antenna elements collectively produces a desired beam profile, the desired delay being composed of a desired focus delay for focussing said array of antenna elements and a desired beam steering delay for steering the beam along a desired azimuth, said step c) of producing including the sub-steps of, c1) producing a first delay portion from a first delay element portion including a plurality N of first delay cells of a first delay resolution factor $r_1$ by inputting a signal into a selected one of a plurality N of first delay cells of a first delay resolution factor $r_1$, n cells from said delay resolution interface to produce a total first delay in said first delay device portion of $n*(\lambda/r_1)$.

c2) producing a second delay portion from a second delay element portion including a plurality P of second delay cells of a second delay resolution factor $r_2$ substantially different from said first delay resolution factor $r_1$, said second delay device portion being connected to said first delay device portion at a delay resolution interface, said step c2) of producing outputting the signal from a selected one of said plurality P of second delay cells of delay factor $r_2$, p cells from the delay resolution interface to produce a total second delay in said second delay portion of $p*(\lambda/r_2)$.

c3) combining the first delay portion and said second delay portion to form the desired individual delay portion to the signal associated with each antenna element;

one of said steps c1) and c2) of respectively producing first and second delay portions providing said desired focussing delay and the other of said steps c1) and c2) providing said desired beam steering delay to collectively form the desired individual delay of each antenna element associated with each charge transfer device which, when added to the common delay portion produced by the sub-array common offset delay, collectively produces the desired delay associated with each antenna element.

38. The method of claim 36 further comprising:

f) selecting a desired delay associated with each of said antenna elements to produce the desired beam profile and for determining the number of respective first and second delay cells necessary to obtain the desired delay;

g) injecting, for each delay device, the signal into the input port of a selected one of said first delay cells; and h) outputting, for each delay device, the delayed signal from the output port from a selected one of said second delay cells.

39. The method of claim 36, wherein the common delay added by said step e) of each sub-array is equal to a maximum desired delay of all antenna elements of a preceding array in said plurality of arrays.

40. The method of claim 36, further comprising altering a sampling rate between said first plurality of cells and said second plurality of cells.

41. The method of claim 36, wherein said step c1) provides a focus for the beam and said step c2) provides steering for the beam.

* * * * *